US005515220A

United States Patent [19]
Alioth

[11] Patent Number: 5,515,220
[45] Date of Patent: May 7, 1996

[54] MULTIELEMENT DISK-SHAPED ROTARY MAGNETIC MEDIA SCANNERS FOR MAGNETIC MEDIA PLAYER-RECORDERS

[76] Inventor: Henry L. Alioth, 2402 La Plancha La., Carlsbad, Calif. 92009-9127

[21] Appl. No.: 176,072

[22] Filed: Dec. 30, 1993

[51] Int. Cl.[6] .............................. G11B 5/027; G11B 5/52
[52] U.S. Cl. ............................................ 360/108; 360/84
[58] Field of Search .............................. 360/108, 84–85

[56] References Cited

U.S. PATENT DOCUMENTS

| | | | |
|---|---|---|---|
| 4,402,027 | 8/1983 | Nakamura et al. | 360/123 |
| 4,426,665 | 1/1984 | Bradford et al. | 360/10.2 |
| 4,669,022 | 5/1987 | Van Rooij | 360/84 |
| 4,791,514 | 12/1988 | Huiger et al. | 360/108 |
| 4,870,522 | 9/1989 | Lelandis | 360/108 |
| 4,914,537 | 4/1990 | Ota | 360/108 |
| 4,927,804 | 5/1990 | Zieren et al. | 505/1 |
| 5,001,585 | 3/1991 | Schaik | 360/108 |
| 5,019,926 | 5/1991 | Van Thuijl et al. | 360/84 |
| 5,072,324 | 12/1991 | Lin et al. | 360/126 |
| 5,113,298 | 5/1992 | Fukushima | 360/108 |
| 5,121,263 | 6/1992 | Kerwin et al. | 360/53 |

FOREIGN PATENT DOCUMENTS

| | | | |
|---|---|---|---|
| 1107292 | 12/1955 | France | 360/108 |
| 56-54620 | 5/1981 | Japan | 360/108 |

*Primary Examiner*—A. J. Heinz
*Attorney, Agent, or Firm*—Frank G. Morkunas

[57] ABSTRACT

A rotary magnetic media scanner for magnetic media player-recorders having a plurality of disk elements where each element is arranged in a simple disk configurations to facilitate manufacture. The disk elements are comprised of high magnetic permeable material and a low magnetic permeable material. The regions made of high magnetic permeable material define magnetic paths which generally have either axial or radial symmetry. Each of the elements form a portion of a complete magnetic circuit. When each of the elements are stacked together, they form a complete magnetic path operable for delivering a magnetic signal read from a tape medium to an electrical transducer and further to an amplifier circuit.

4 Claims, 7 Drawing Sheets

MULTIELEMENT DISK-SHAPED ROTARY MAGNETIC MEDIA SCANNERS FOR MAGNETIC MEDIA PLAYER-RECORDERS

BACKGROUND OF THE INVENTION

This invention is concerned generally with magnetic media player-recorders for example video recorders, digital audio recorders, disk drives and others, and is concerned specifically with simplified read/write scanners and scanner arrangements for such magnetic medium player-recorders. A read/write scanner is typically a cylindrical device with a portion that is movable in a rotational sense which includes a transducer or transducers that are operable for transforming a recorded signal of a magnetic medium to a physical signal, usually a magnetic field in a magnetic circuit and further to an electrical signal in a conductor, and further transmitting that electric signal to a stationary electrical amplifier circuit, and capable of the reverse operation, writing to a magnetic medium starting with an electrical signal and converting to a magnetic signal and then finally to a recording on a magnetic medium.

The manufacture of these complicated devices is quite difficult because many elements having sophisticated geometries must be precisely built and aligned. Manual labor is usually required because the arrangement of the elements including coils of complex shapes is unyielding to the properties of automation.

In state of the art equipment, one can find the most popular scanner configuration including a magnetic core with a very small gap which is generally in electro-magnetic communication with an electrical coil wound about that core. This device is sometimes called a head. The electrical coil of the head is then connected to the primary windings of a rotary transformer, the transformer being operable for passing the signal from the rotating portion of the device to a stationary amplifier circuit and having a second function in more sophisticated devices of multiplexing the signal from a plurality of heads to a single amplifier circuit. This can be accomplished if the rotary transformer has a plurality of primary windings that are arranged to communicate with a single secondary winding where each of the primary windings is in further communication with a separate head. The entire device which may be required to rotate at high speeds is required to be precisely built. The assembly process of scanners which comprises heads, transformers, and coils is time consuming and expensive. While some progress has been made in the combination of some of these parts into simpler devices, see U.S. Pat. No. 4,791,514, the devices of the art are still very cumbersome.

A further problem found in the scanners of the art, is that they are not replaceable in the location in which the are used; "field-replaceable". Because of the arrangement of the elements in these scanners, the scanner must be very precisely aligned to the motor which turns the scanner. The alignment process requires that an oscilloscope or other precision electronic measurement devices be used. It is also necessary for soldering equipment to be used in the replacement of scanners. For these reasons, it is common for head replacements to be made in an electronics shop.

This application partially relies on disclosures of a co-pending application numbered 08/076,546 and all of the disclosure made therein is hereby incorporated by reference into this application.

The inventor respectfully acknowledges the following very useful contributions to the art by the following inventors: Van Rooij in U.S. Pat. No. 4,669,022; Van Thuijl; et al, in U.S. Pat. No. 5,019,926; Zieren; et at., in U.S. Pat. No. 4,927,804, in particular FIG. 1; Lin; et al., in U.S. Pat. No. 5,072,324, in particular FIG. 4; Nakamura et al., in U.S. Pat. No. 4,402,027, in particular FIGS. 11, 15A, 15B, and 15C; Schaik in U.S. Pat. No. 5,001,585; Ota in U.S. Pat. No. 4,914,537. The very significant inventions mentioned each offer unique additions to the art which are no less than remarkable. However, these patents when considered individually or in combinations thereof, fail to provide the advantages and benefits which can be realized by applying the principles and concepts described in detail in the following text.

A scanner generally has two functions, a first is to convert magnetic signals from a magnetic media to electric signals, and a second is to multiplex magnetic signals from a plurality of transducers to a single amplifier circuit. In this sense, devices of the art are multiple transducers that are multiplexed to a single amplifier circuit through a rotary transformer or transformers. Recall that a transducer can be defined as a device that converts energy from one system to energy in another system usually of a different form. The device of the invention is distinct from the devices of the art in that a new transducer is arranged to perform the multiplexing function eliminating the need for transformers and the windings on the head's magnetic cores. The invention provides for a super single transducer that multiplexes a plurality of head elements through various magnetic paths including some stationary paths that are in communication with electronic amplifier circuits. The multiplexing and energy conversion functions are integrated together in a single transformerless transducer device. One can immediately recognize the devices of the invention because the primary and associated secondary windings of transformers are absent in the very distinct scanner arrangements provided therein.

SUMMARY OF THE INVENTION

The present invention offers a novel arrangement of magnetic media scanner components to realize a superior scanner that is simple and inexpensive to manufacture and is field replaceable. The number of electrical coils in scanners known in the arts is greatly reduced. The new geometries introduced facilitate automation in the manufacture process. The new geometries and arrangements also provide for simplified scanner to indexing thereby allowing field replaceable scanners.

A sophisticated arrangement of magnetic conductors, sometimes called "ferrites" in reference to the materials they are usually made of, define magnetic paths through which magnetic signals are transmitted. The moving parts are designed to multiplex a plurality of read/write heads to a single stationary magnetic path in communication with an electric conductor where the magnetic signal is converted to an electric signal before amplification.

It is of great significance to note that various disk shaped layers of the device have cylindrical symmetry and arbitrary thickness. It is possible to completely specify each of these disk layers in two dimensions. These disks individually are very easily machinable using automated techniques. A plurality of these disks, when brought together, form the multiplexing transducer scanner device. Scanner elements comprised of disk stacks cannot be found in the art. An entire scanner of the art, including a plurality of transducers, electrical coil windings and rotary transformers is reduced to a sophisticated transformerless transducer scanner.

A primary object of this invention is to provide superior magnetic media player-recorder scanners which include single or multiple read/write heads.

A further object is to provide sophisticated scanner multiplexing transducers.

A still further object of the invention is to provide a means to increase the automation used in scanner manufacturing processes thereby reducing the costs of those processes.

A still further object of the invention is to provide a field-replaceable magnetic media scanner.

It is an object of the invention to provide disk shaped articles of manufacture that can be used in combination with similar disks to form a magnetic media scanner.

It is an object of the invention to provide methods of transducing a magnetic signal from and to a magnetic media to and from an electronic amplification circuit.

It is an object of the invention to provide apparatuses that are superior magnetic media player-recorder scanners which include single or multiple read/write heads.

BRIEF DESCRIPTION OF THE DRAWINGS

These and other objects, features, aspects, and advantages of the present invention will become better understood with regard to the following detailed description of some of the preferred embodiments, appended claims and drawings where:

figure one is an exploded perspective drawing of a version of the invention having four heads addressing a media surface that is orthogonal to the rotation axis of the device;

Figure 1:
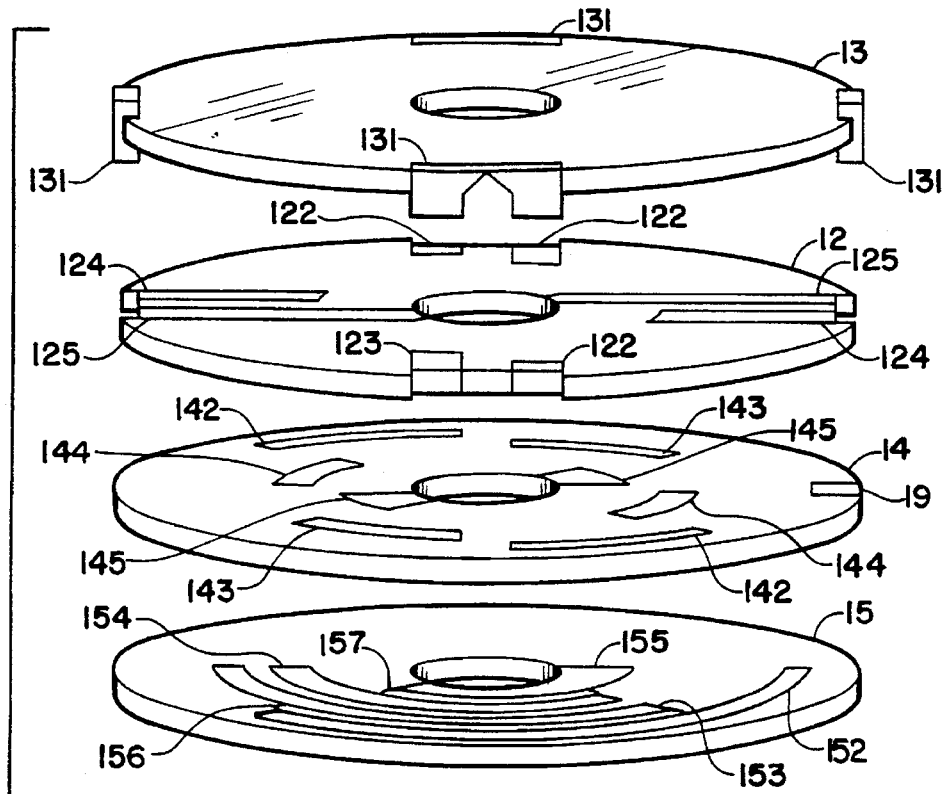
Figure 10:
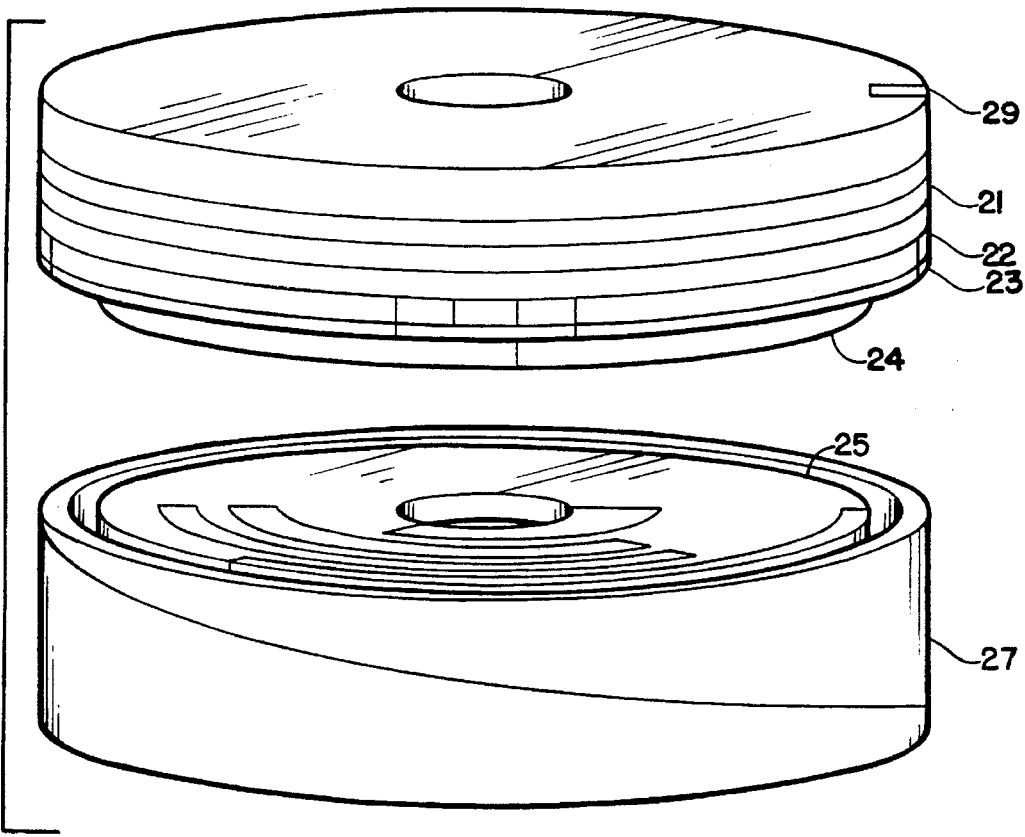

figure two is an exploded perspective drawing of a preferred version of the invention having heads which can address magnetic media in a helical scan format such as is used in common video cassette recorder-players;

figure three is an exploded perspective drawing of a similar embodiment as depicted in figure two but having only two heads;

figure four is an exploded perspective drawing of an embodiment employing a magneto-resistive sensing element;

figure five through eight are drawings of single layers of the preferred embodiment depicted in figure two and more specifically:

figure five is a cross sectional view of a layer having heads thereon, figure six is a cross sectional view of a layer having radial magnetic paths, figure seven is a cross sectional view of a layer having axially symmetric, arcuate magnetic paths, figure eight is a cross sectional view of a stator layer disk having arcuate magnetic paths in communication with an electrical conductor or conductors;

figures nineA and nineB are details of a magneto resistive sensing device;

figure ten is a perspective view of an assembled apparatus of figure two.

PREFERRED EMBODIMENTS OF THE INVENTION

The invention is primarily characterized by unique scanner having rotor and stator elements that have been arranged to facilitate manufacture and high performance. Specifically, the new scanners of the invention employ a magnetic circuit arrangement on a plurality of disk elements which together form the stator and rotor portions of a scanner device.

If one considers the lessons learned in electronic printed circuit design, a simple analogy can be drawn to the multiple layers common in those devices. In order for the paths to cross without causing a "short" circuit, a multilayer structure of conductors and insulators is used. For example, a complicated grid can be formed with many parallel lines going north and south on the top surface of an insulator material and many orthogonal lines going east and west on the bottom surface of the same insulation material. In this way, the paths on the top surface are electrically isolated from the paths on the bottom surface except for a residual capacitance which can be negligible. Communication between north-south lines and east-west lines can selectively be activated by creating a conductive path through the insulating material layer.

The present invention is one having magnetic circuits which employ some of the same principles of electronic printed circuits. Particularly, it is necessary to route a magnetic path to form a closed magnetic circuit without creating a "short" circuit. But because electrical conductors and magnetic conductors also have many different properties, there are great differences between the two technologies. Due to the geometries of the mechanical scan and multiplexing function of rotating scanner devices, preferred embodiments of the present invention are also greatly concerned with the geometry of the device onto which the circuit is formed. This is in contrast to electronic circuits and circuit components which rarely dictate the geometry of a circuit board and electronic circuit boards are typically planar rectangular. Therefore, the geometry of the scanning device will influence the final product.

Figure 2:
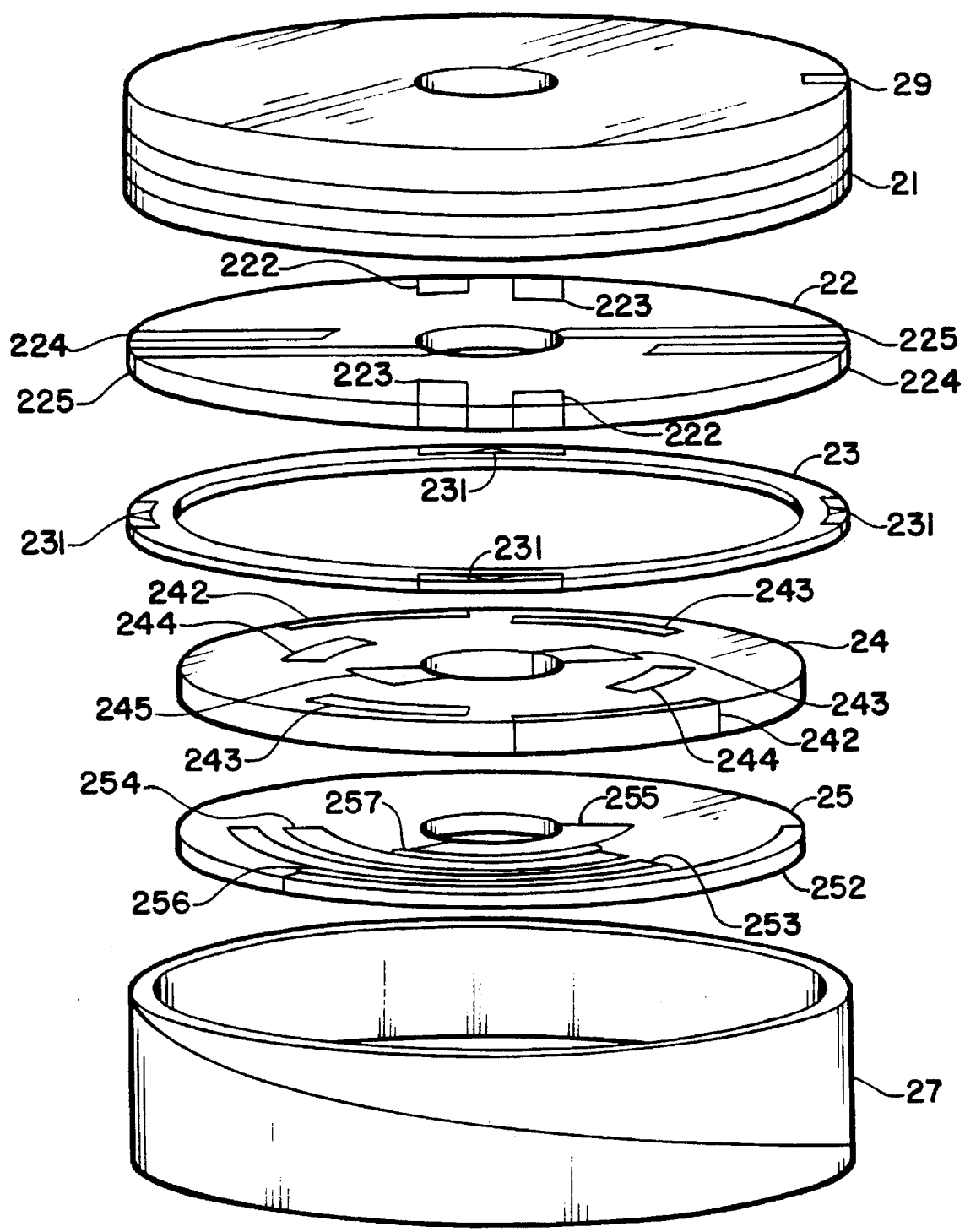

Some magnetic player-recorder devices have the magnetic media located in a plane that is orthogoal to the axis of rotation of the scanner. FIG. 2 of the disclosure in U.S. Pat. No. 4,791,514 shows this arrangement that is well known in the art. Figure one of the current disclosure shows preferred embodiments of the invention suitable for use in such arrangements. There are four layers 12, 13, 14 and 15 in figure one: three 12, 13, and 14 are fixably mounted to each other in a stack and rotatable about their axes of symmetry, and a fourth 15 remains stationary in relation to the others but has a top surface that is in close proximity to the bottom surface of the third disk 14 of the three disk stack. A plurality of magnetic core elements 131 which can be manufactured according to the processes currently known in the art and later placed into the disk 13 are sometimes referred to as "heads". The scanning device of this first example therefor has four "heads". unlike the heads known in the art which are generally in electromagnetic communication with an electrical conductor winding, the heads of the invention are in magnetic communication with magnetic flux carrier paths 122, 123, 124 and 125 of the second disk 12. Magnetic flux carrier paths are easily affected by having a disk comprised of two types of materials; a first material that has a high magnetic permeability such as a ferromagnetic material sometimes and herein called "ferrites" and a second material having a low magnetic permeability such as plastic. It should be understood that "ferrites" is the term used to refer to the high magnetic permeability material, and further, it is possible to have a high magnetic permeable material that is not a ferromagnetic, ferromagnetic materials are simply the preferred material. Similarly, it is strictly not a requirement to use plastic for the low magnetic permeable materials and there are many thousands of materials that are not plastic that may work well.

It may be possible to have a disk "blank" that can be cut to have grooves that can accommodate the ferrites pieces, alternatively, a plastic disk may be molded around the ferrite pieces held by a jig. Although disks 13 and 12 are shown as two separate disks for clarity, they could be combined together as a single disk and achieve the same function. The ferrites of disk layer 12 extend generally in the radial direction. Each path 122, 123, 124 and 125 extend from the periphery to different radius than the others. Therefore, each interior end of those ferrites will be in communication with a separate ferrite element occupying a different radial region of an adjacent disk 14. Ferrites in the disk 14, numbered 142, 143, 144 and 145 have axial-cylindrical symmetry and are generally arcuate in shape. If the axes of disks 12 and 14 are collinear and the bottom surface of disk 12 as shown in the figure is in proximate contact with the top surface of disk 14, some of the ferrites of disk 12 will share common areas with some of the ferrites in disk 14. Specifically, ferrites 122 and 142, ferrites 123 and 143, ferrites 124 and 144, ferrites 125 and 145. One can quickly appreciate the redundancy of the other ferrites and they are appropriately numbered in the drawing. Since the ferrites of disk 12 share common areas of disk 14 when they are brought into proximity with each other, magnetic communication between those ferrites sharing a common area is facilitated. Magnetic flux in ferrite 125 never gets passed to ferrite 144. This is because the disks 14 and 12 are fixed with respect to each other when in operation and ferrite 125 never shares a common area with ferrite 144. It is now easy to understand that magnetic flux appearing in the gap of the head is transmitted into the head core, the ferrites of the disk 12, and into the axial symmetric arc shaped ferrites of the disk 14. Those familiar with rotary transformers can now easily understand that if disk 15 is a stationary disk having ferrites 154 and 155 that are magnetically connected to each other and have an electrical conductor 157 in communication therewith, and similarly that 152 and 153 are magnetically connected and have an electrical conductor 156 in communication therewith, complete magnetic circuits are formed for various alignments of disk 14 and 15. By 'electromagnetic communication' it is meant to refer to any electromagnetic interaction, including simple magnetic only and electric only, as described by Maxwell's equations and derivatives thereof which are well known to those skilled. Recall that disks 12, 13, and 14 are fixed together. With careful attention one can note from the figure that heads that are oppositely mounted on the disk 13 are multiplexed to the same electrical conductor of disk 15. A very popular configuration demands that a track on a magnetic media be read immediately after being written to check for errors. The scanner depicted in figure one would be useful for this arrangement as the interior circuit of disk 15 which includes conductor 157 could be assigned the read duties and the exterior circuit which includes conductor 156 could be assigned the write duties and/or vise-versa. With carefully chosen offset positioning of the head elements which is well known in the art, the proper timing for a write-then-read system could be realized.

Finally, it should be pointed out that disk 14 has a peculiar asymmetry numbered 19. This element can be a ferrite or permanent magnet or even an optical device such as a reflector, and serves as an index. The index locates the head gaps in time as is required for tracking functions. As disk 14 rotates a complete revolution, the index 19 will pass a pick-up sensor which calibrates the rotational position of the disk. In scanners of the art, a similar index is generally found on the motor or motor shaft. A very complicated motor/scanner alignment procedure is required to replace scanners in current player-recorders. By having the index integrated into the rotary disks, scanners can be placed onto motors without any concern for the orientation of the disk with respect to the motor shaft thereby eliminating the need for the alignment procedure. This makes the scanners of the present invention useful as field-replaceable scanners.

The invention's teachings can be applied with great benefits to configurations common in other magnetic media player-recorders. A very popular format is the helically scanned format of video cassette recorders. The drawing figure two shows how concepts of the invention could be applied to that format. The example depicted shows a head 231 arrangement having a line of address which describes a helix about the magnetic media (drum) axis hence the name "helically scanned". A drum 27 having a helical groove cut thereinto serves to align and guide the magnetic medium which is usually a long tape that is wound onto a cassette. In popular versions of this format, the tape is wrapped about the drum over an arc of approximately 90 degrees. It is possible to have the tape wrapped over an arc of 180 degrees or other amounts and still make a useful device. The present example adopts the particular configuration where the tape is wrapped 90 degrees. Various mechanical features particular to this format and known in the art can easily be incorporated into this new device. For example, it is known to provide for an air bearing for the tape to ride on as it passes over the drum. A disk 21 having grooves cut thereinto can provide the mechanics for the air bearing as is done in scanners of the art. It is a variation from the previous example that the disk containing the heads 23 is not the uppermost disk. This is possible because the disks of the invention can have peripheries of various radii and fit together in many alternate fashions. The outside radius of disk 24 is smaller than the inside radius of disk 23 allowing it to fit into disk 23 such that the top surface of disk 23 and disk 24 are coplanar. Since disk 24 is thicker than disk 23, the bottom surfaces of those disks are not coplanar. In this arrangement, the ferrite elements of disk 22, numbered 222, 223, 224, and 225 can be in magnetic communication with the ferrite elements of both disk 23, numbered 23 1 and disk 24, numbered 242, 243, 244, and 245. Careful examination of the drawing figure reveals that the innermost portion of the head ferrites 231 do not coincide with the inside radius of the disk 23 or the outer radius of the ferrite arcs 242. There will not be direct communication between the ferrite elements of disk 23 and the ferrite elements of disk 24. The magnetic flux in ferrites of disk 23 will be first transferred to the ferrites of disk 22 and then to the ferrites of disk 24. Although it may be possible to combine the disks 22, 23 and 24 into a single disk, the complexity may be such that super disk would be difficult to manufacture. It is a primary object of the invention to provide disks with very simple geometric arrangements thereby allowing for a high degree of automation in the manufacturing process. One can appreciate that the geometries of the disks 22, 23 and 24 are very simple.

The stator disk 25 of figure two is the same as the stator disk 15 of figure one and communication between the rotary disks and that disk is similar. We can now trace the information that was recorded as a signal on a magnetic medium through the elements of the scanner and finally to an amplifier thereby fully describing the transducing and multiplexing functions of the new scanner of the invention. Information that was recorded onto a magnetic medium such as a tape passes along a drum 27 guide. A plurality of rotary disks 23, 22, and 24 fixably mounted together and further fixed to a motor shaft rotate about the symmetry axes of those disks. The head 231 portion of disk 23 passes across the magnetic medium such that signals recorded thereon cause an excitation of a magnetic field in the head core ferrite material. The magnetic signal is transmitted to the ferrites of disk 22 because the top surface of disk 23 is coplanar with the bottom surface of disk 22 and the ferrites 23 1 of disk 23 share a common area with the ferrites 222, 223, 224, and 225 of disk 22. The magnetic signal is further transmitted to the ferrites of disk 24 similarly because the top surface of disk 24 is coplanar with the bottom surface of disk 22 and the ferrites 242, 243, 244, and 245 of disk 24 share a common area with the ferrites 222, 223, 224, and 225 of disk 22. At particular times during the rotational cycle of the rotary disks 22, 23 and 24 which are fixed together, the ferrites 242, 243, 244, and 245 of disk 24 will share a common area with the ferrites 252, 253, 254, and 255 of the stationary disk 25. Since the ferrite 252 and 253, and 254 and 255 are magnetically connected, see figure eight cross sectional view labeled "section A—A", and conductors 256 and 257 are in electro-magnetic communication respectively therewith, the magnetic circuit of the scanner is completed for various angular position of the rotor and the signal is transduced and multiplexed to the conductors and finally to an electrical amplification circuit.

Note that disk 21 incorporates the index 29 which is similar to the index 19 of disk 14 of figure one as discussed in the previous example. This is a new feature of the invention that is not found in old scanners.

Figure 3:
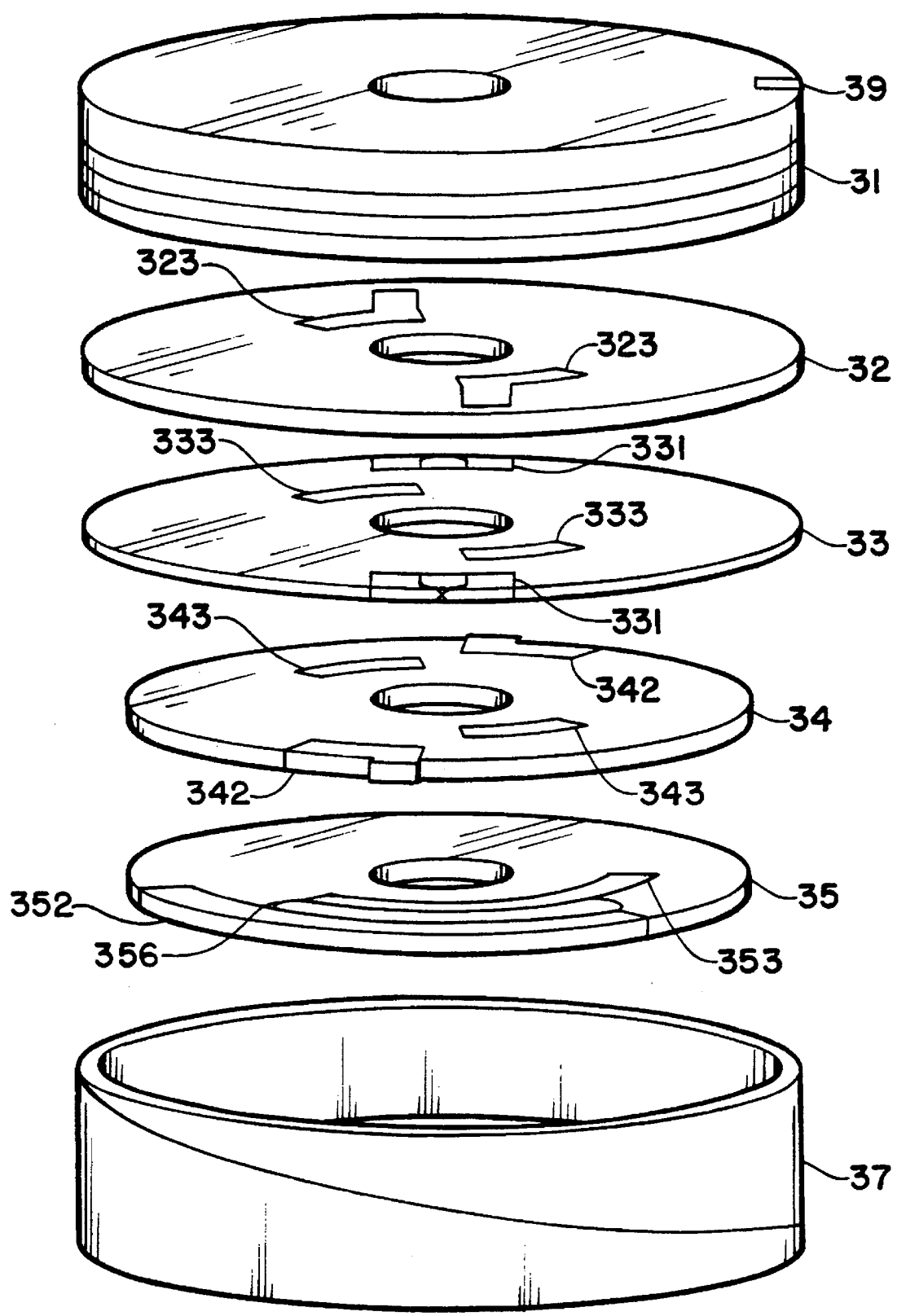
Figure 4:
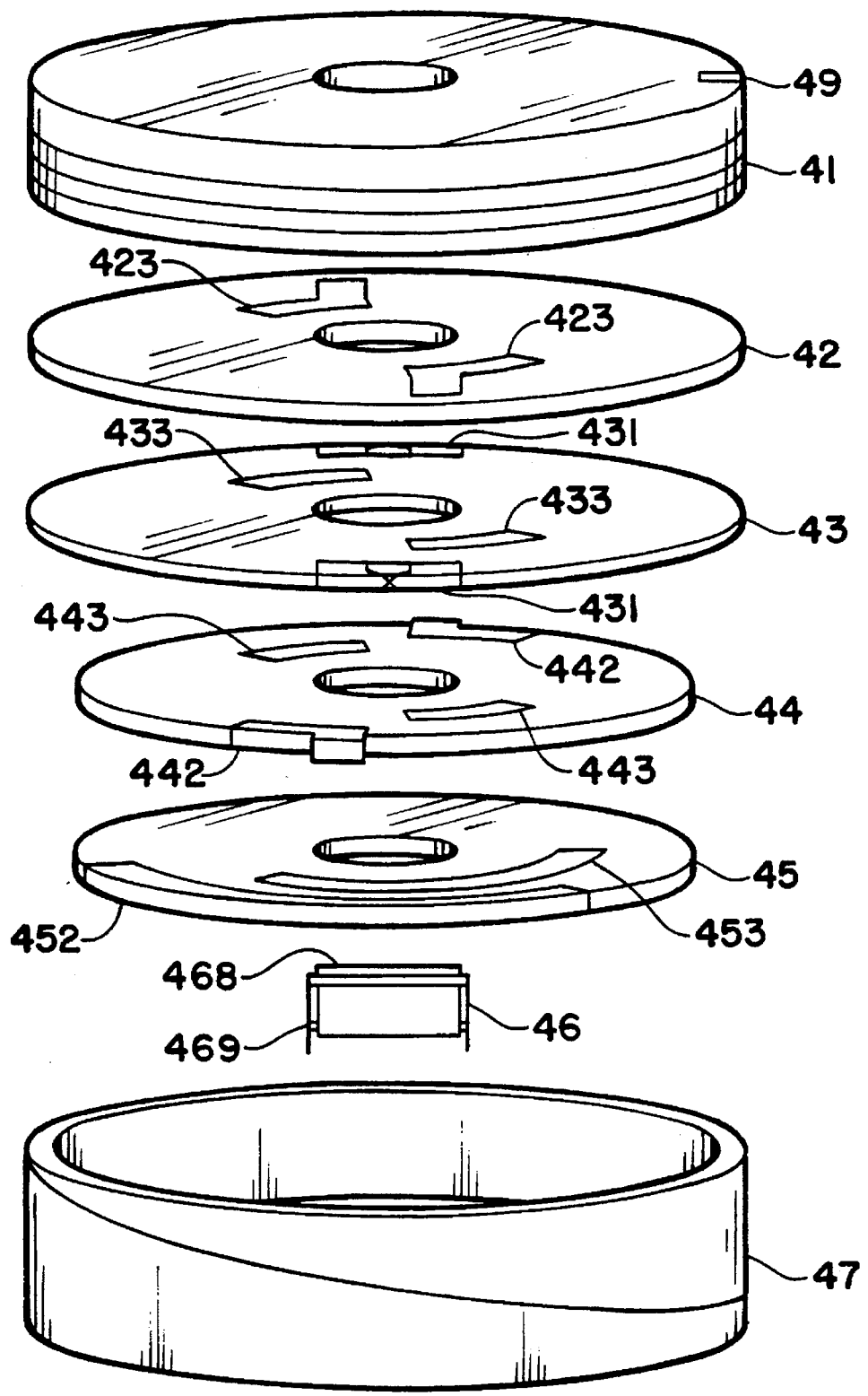
Figure 6:
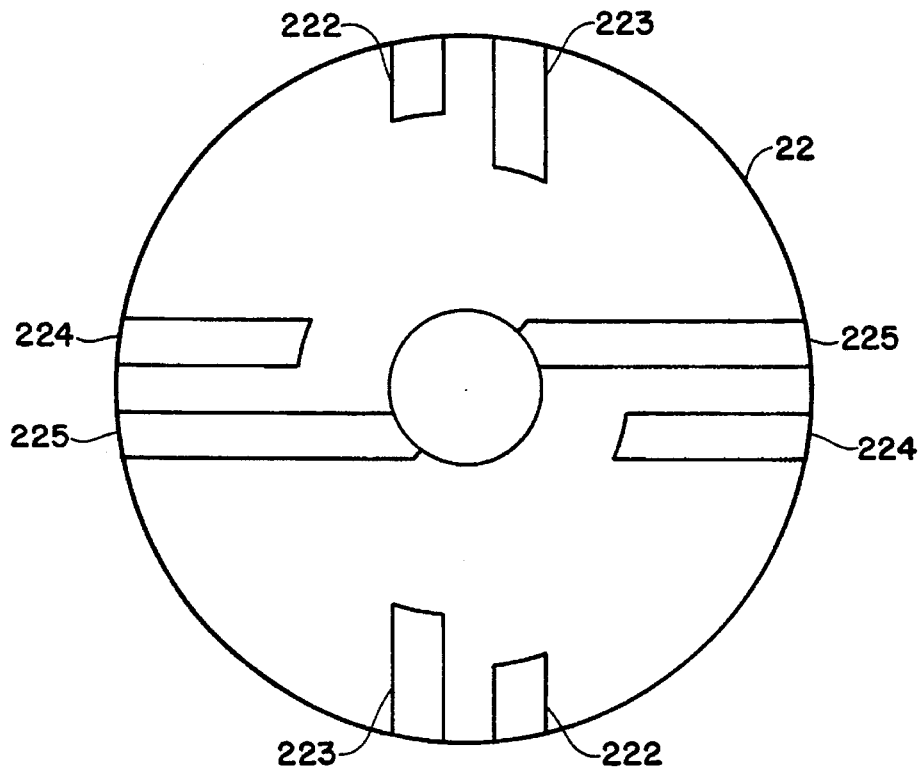
Figure 5:
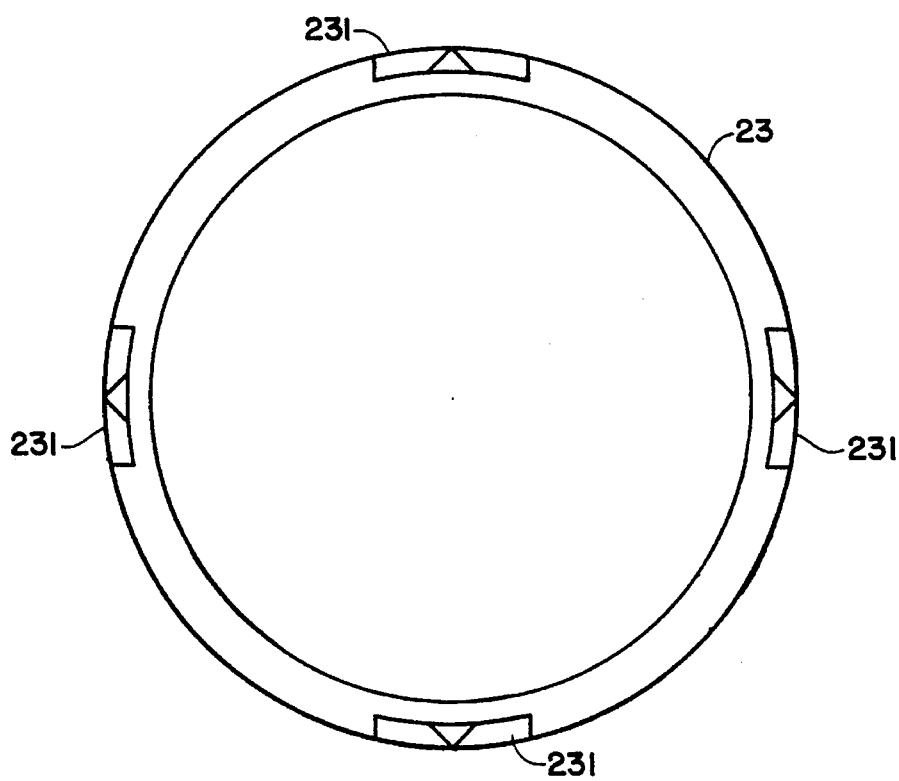
Figures 8A, 8B:
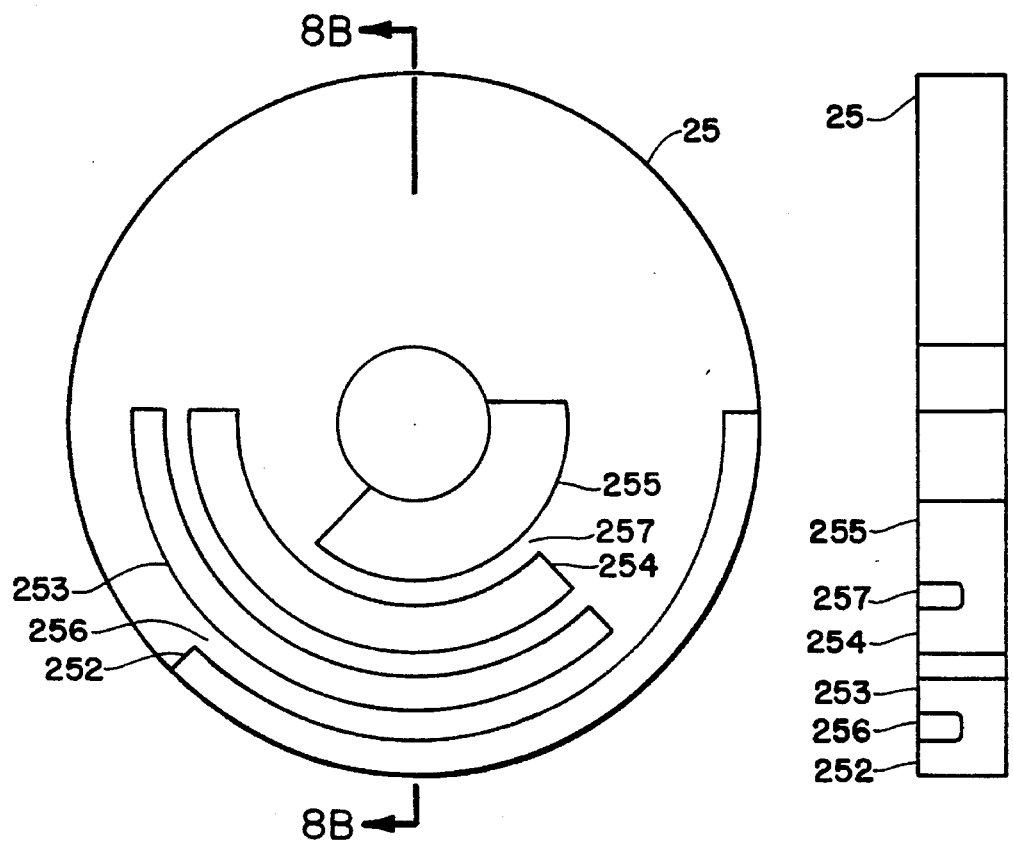
Figure 7:
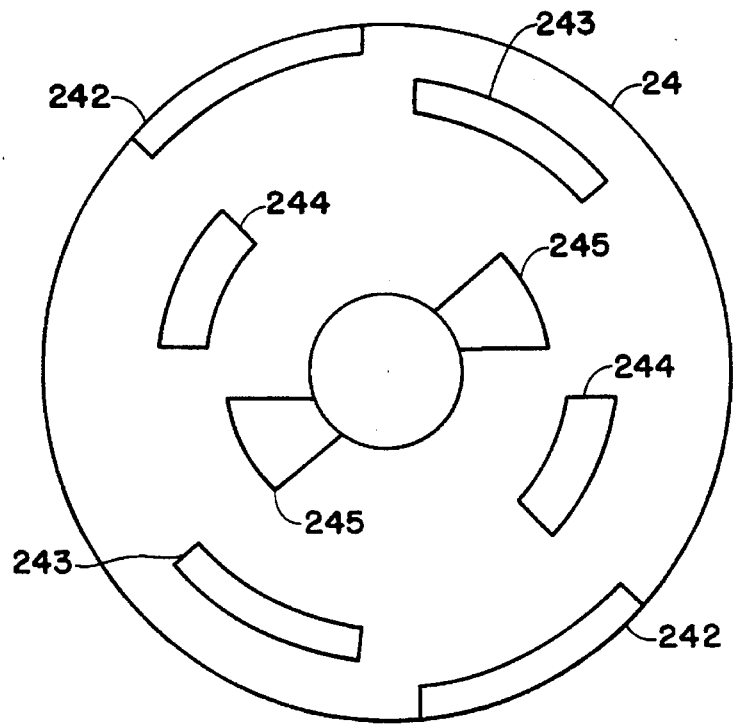
Figure 9A:
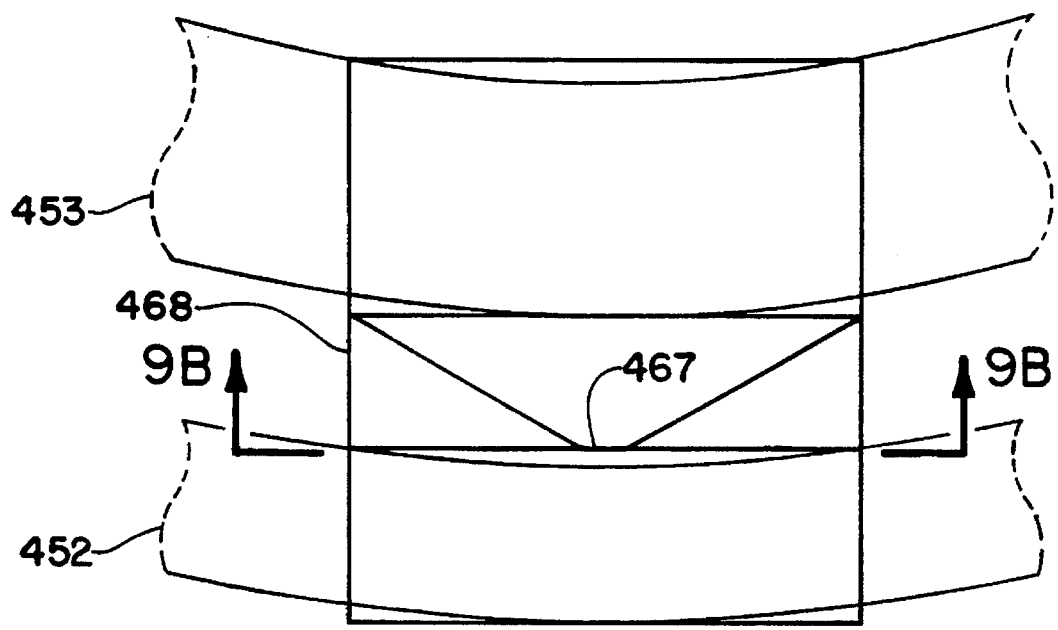
Figure 9B:
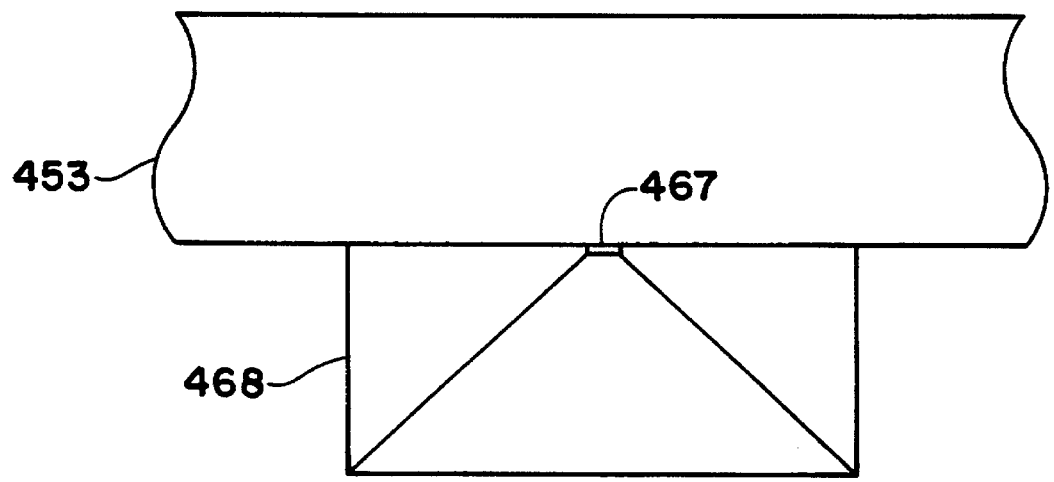

A third example illustrating preferred embodiments of the invention is illustrated in FIG. 3. The format of this example is the same "helically scanned" format of figure two. Several differences have been implemented in this example to illustrate that the invention can be embodied in a wide range of possibilities. Particularly, the magnetic paths starting from the two sides of the gap of the head 331 can actually be routed to different adjacent disks, disk 32 and disk 34. If one envisions the head as having two portions, a left portion and a right portion, then the left portion can be in communication by sharing a common area with the ferrite of disk 34, numbered 342, and the right portion can be in communication by sharing a common area with the ferrite of disk 32, numbered 323. The ferrite 323 has the job of carrying the magnetic flux into the interior of the disk. The ferrite 323 is then in further communication with the ferrite 333 on the adjacent disk 33 which is communication with the ferrite 343 on disk 34. The careful observer will then realize that the two sides of the circuit have been routed to a different radius of the disk system. In this way, communication with the stator disk 35 ferrites 352 and 353 and finally with the electrical conductor 356 is realized in the same way as was shown previously. Disk 34 has a special property were the periphery is not exactly circular. The ferrites 342 stick out of the strict circular border. There is nothing sacred about the periphery being shown as a circle and the words substantially circular are used herein to mean that any shape that rotates about an axis will tend to imply a circular area of concern. Indeed most of the area of disk 33 and disk 32 is unused. If all of the material the disk is comprised of is cut away except for the areas immediately around the ferrites the shape of the device will not even approximate a disk or a circular periphery. However if one rotates that device about an axis as shown then the outermost point of the disk will trace an area of concern that is circular. It is believed disk shaped blanks will be the easiest to process but the reader is reminded that other possibilities will still be considered within the scope of the invention.

Figure four illustrates an alternate electrical conductor. Although coils of wire are quite good for converting the magnetic field signals in the stator ferrites to electric signals that can be easily amplified, the invention can be used with other type of devices to serve this function. A magneto-resistive device 467 is still an electrical conductor but is special in that its resistance is dynamically responsive to magnetic field changes in the device. Amplifier circuits can be designed to be responsive to this resistance modulation compared to the voltage signal of a conductor winding. Some magneto-sensitive devices are commonly known as Hall devices as they function by laws described by the "Hall effect". Because the Hall effect does not work to produce magnetic fields, a coil of wire can be wound thereabout to serve the write function that read/write scanners require.

The description of the preferred embodiments illustrated in figure two can become more clear in consideration of the drawing figures five through eight. These drawing figures are cross-sectional views of the disks. Figure five shows a disk 23 having four heads 231 each distributed about the circumference, at 90 degree intervals. The process for making the heads is very well developed and embodiments of the invention are designed to accommodate those processes with only minor changes. Heads made in the old way can be snapped into place in the new disk arrangement of the invention. Snapped into place is an example but other forms of mounting heads to the disk 23 are possible. The disk 23 is special because it has a inner radius with a relatively large diameter. The inner radius is usually provided for a disk to accommodate a motor shaft but if a disk is mounted to an adjacent disk then it is indirectly mounted to a motor shaft by way of that adjacent disk.

Figure six shows magnetic paths as defined by the ferrites that map the two sides of various heads 23 1 to different radial regions. The interior ends of those ferrites lie in four unique radial positions and the ends will locate areas of overlap between ferrites of adjacent layers. One should note a two-fold redundancy and the figure numbers correspond to that redundancy.

The disk 24 in figure seven has ferrites 242, 243, 244, and 245 with axial symmetry in the shape of arcs. The angle which they subtend is approximately 45 degrees. This is such that a closed magnetic path is completed for a specified scan angle. The angle which the medium is in contact with the drum is arbitrary and depends on the particular device design. The angles subtended by the ferrites are adjusted according to those various designs. Each ferrite has an arc shaped interior edge and an arc shaped exterior edge. The difference in radius between these arcs is not constant from ferrite to ferrite of a single disk. Since the reluctance of two ferrites in proximity depends on the area of overlap, it is desirable to have the surface area of the ferrite overlap of various radial regions to be the same as corresponding ferrites of the same continuous circuit. The arrangement shown makes the difference in area of overlap independent of the angular position of the disks.

Figure eight shows the stator disk having arc shaped ferrites which subtend an angle of 90 degrees plus the angle subtended by the ferrites of the disk in figure seven. This corresponds to the particular version that was mentioned earlier where the magnetic medium is in contact with the drum over an angle of 90 degrees. Figure eight section A—A shows how electrical conductors 256 and 257 can be integrated into the disk such that they are entirely below the top surface thereof.

Figures nine A and nine B is a drawing of how a magneto-resistive device 467 could be mounted in relation to the stator ferrites 453 and 452 and a cross section view of that device, section A—A.

Figure ten shows the device of figure two when it is assembled into two portions a stator portion and a rotor portion. In operation, the stator top surface and rotor bottom surface are in proximity.

In each of FIGS. 1–4 an index element is included near the periphery of the disk.

The invention can be embodied in various versions of apparatuses, methods, and articles of manufacture, where apparatuses of the invention include:

an apparatus operable for scanning a signal on magnetic media comprised of a plurality of disk elements having a top planar surface, a bottom planar surface parallel thereto, a substantially circular periphery, and an axis of symmetry, said disks being comprised of two materials, a first material of high magnetic permeability and a second material of low magnetic permeability, wherein a first disk having magnetic paths thereon is rotatably movable about its axis of symmetry and is in magnetic communication with a second disk stationary with respect to said first disk such that magnetic signals in the paths of the first disk are transmitted to magnetic signals in the second disk, said second disk having magnetic paths thereon in electro-magnetic communication with an electrical conductor such that magnetic signals in the magnetic paths of the stationary disk are converted into electrical signals in the electrical conductor;

and, an apparatus operable for scanning a signal on magnetic media comprised of: a rotor; a stator; an index element; wherein said index element is fixably mounted to said rotor and is operable for locating a particular angular orientation of the rotor and signaling that orientation to a timing circuit, said rotor is rotatably movable about an axis and is in proximity to and in magnetic communication with said stator, the methods of the invention include:

a method of transducing a signal on a magnetic medium, to and from an electronic circuit which comprises the steps:

passing the gap of a ferrite core across magnetic media;

transmitting the magnetic signal generated in said ferrite core through magnetic-paths in a first rotating disk having: a planar top surface; a planar bottom surface parallel thereto; a substantially circular periphery; and an axis of symmetry, to a stationary disk having: a planar top surface; a planar bottom surface parallel thereto; a substantially circular periphery; and an axis of symmetry, wherein said stationary disk has magnetic paths that are in electro-magnetic communication with an electric conductor;

and, a method of manufacturing a scanner for magnetic media player-recorders having the steps of forming a disk having a top planar surface, a bottom planar surface parallel thereto, a substantially circular periphery, and an axis of symmetry, said disk being comprised of high magnetic permeability materials and low magnetic permeability materials, and the articles of manufacture include:

an article of manufacture operable as a magnetic circuit element for use in conjunction with other similar articles to form a magnetic media player-recorder scanner which comprises a disk with a substantially circular periphery having a planar top surface and a planar bottom surface parallel to said top surface, said disk being comprised of a first material of high magnetic permeability and a second material of low magnetic permeability such that the materials boundaries define a magnetic path operable for routing magnetic flux through said disk.

I claim:

1. An apparatus operable for scanning a magnetic media and commuting a magnetic signal said apparatus being comprised of a plurality of disk elements, each disk element being comprised of:

magnetic paths;

a top planar surface;

a bottom planar surface;

a substantially circular periphery; and an axis of symmetry, said magnetic paths being defined by boundaries of high permeability magnetic material and low permeability magnetic material, both high permeability magnetic material and low permeability magnetic material being bound by said top planar surface, bound further by said bottom surface, having uniform cross-section geometry from the top planar surface to the bottom planar surface, and bound still further by said circular periphery, all centered about said axis of symmetry, said plurality of disk elements being comprised of:

a first disk;

a second disk; and any whole number of additional disks, the first disk element being rotatably movable about its axis of symmetry having said bottom surface of first disk element in close proximity to and in magnetic communication with said top surface of said second disk and the bottom surface of said second disk being in close proximity and magnetic communication with a surface of another disk.

2. An apparatus of claim 1, the first disk element being rotatably movable about its axis of symmetry having said bottom surface of first disk element in close proximity to and in magnetic communication with said top surface of said second disk and the bottom surface of said second disk being in close proximity and magnetic communication with a surface of another disk such that magnetic signals in the paths of the first disk are transmitted to magnetic signals in the second disk, said second disk having magnetic paths thereon in electro-magnetic communication with an electrical conductor such that magnetic signals in the magnetic paths of the stationary disk are convened into electrical signals in the electrical conductor being similarly in close proximity thereto.

3. An apparatus of claim 1 wherein the scanning operation of the magnetic media and commuting the magnetic signal comprises reproducing and recording.

4. A method of transducing a signal of a magnetic medium to and from an electronic circuit which comprises the steps of:

passing a ferrite core having a gap across magnetic media;

transmitting a magnetic signal generated in said ferrite core through magnetic paths defined by geometrical arrangements of high magnetic permeability materials and low magnetic permeability materials in a first rotating disk having a top planar surface, a bottom planar surface parallel thereto with uniform cross-section geometry from the planar top surface to the planar bottom surface, a substantially circular periphery, and an axis of symmetry, to magnetic paths of an adjacent rotating disk having a top planar surface, a bottom planar surface parallel thereto, a substantially circular periphery, and an axis of symmetry, whereby the geometrical arrangements of high magnetic permeability materials and low magnetic permeability materials of said first disk is a different arrangement than of the second disk and the patterns have areas of overlap when either surface of the first disk is in close proximity to either surface of the second disk and the axes of symmetry of both disks are collinear; and further transmitting the magnetic signal from a disk to a stationary disk with magnetic paths that are in communication with an electronic transducer.

* * * * *

UNITED STATES PATENT AND TRADEMARK OFFICE
CERTIFICATE OF CORRECTION

PATENT NO. : 5,515,220
DATED : May 7, 1996
INVENTOR(S) : Henry L. Alioth

It is certified that error appears in the above-indentified patent and that said Letters Patent is hereby corrected as shown below:

Column 10, line 37, after the word "disk" add the following --whereby said magnetic signal is conducted along certain of said magnetic paths to and/or from said media during scanning--

Column 10, line 49, delete the word "convened" and insert the word --converted--

Signed and Sealed this

Sixth Day of August, 1996

Attest:

BRUCE LEHMAN

Attesting Officer     Commissioner of Patents and Trademarks